United States Patent
Fujioka et al.

(10) Patent No.: US 8,416,227 B2
(45) Date of Patent: Apr. 9, 2013

(54) DISPLAY DEVICE HAVING OPTICAL SENSORS

(75) Inventors: Akizumi Fujioka, Osaka (JP); Toshimitsu Gotoh, Osaka (JP); Akinori Kubota, Osaka (JP); Masaki Uehata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/867,773

(22) PCT Filed: Feb. 16, 2009

(86) PCT No.: PCT/JP2009/052479
§ 371 (c)(1),
(2), (4) Date: Aug. 16, 2010

(87) PCT Pub. No.: WO2009/110294
PCT Pub. Date: Sep. 11, 2009

(65) Prior Publication Data
US 2011/0007047 A1   Jan. 13, 2011

(30) Foreign Application Priority Data

Mar. 3, 2008 (JP) .................................. 2008-052161

(51) Int. Cl.
*G06F 3/042* (2006.01)
*G09G 3/30* (2006.01)

(52) U.S. Cl.
USPC .............................. 345/207; 345/175; 345/76

(58) Field of Classification Search .................. None
See application file for complete search history.

(56) References Cited

U.S. PATENT DOCUMENTS

| | | | |
|---|---|---|---|
| 7,804,479 B2 * | 9/2010 | Furukawa et al. | 345/102 |
| 2002/0025837 A1 | 2/2002 | Levy | |
| 2004/0169625 A1 | 9/2004 | Park et al. | |
| 2006/0244693 A1 * | 11/2006 | Yamaguchi et al. | 345/76 |
| 2006/0256093 A1 | 11/2006 | Furukawa et al. | |
| 2006/0262055 A1 | 11/2006 | Takahara | |
| 2007/0296688 A1 | 12/2007 | Nakamura et al. | |
| 2008/0122803 A1 * | 5/2008 | Izadi et al. | 345/175 |

FOREIGN PATENT DOCUMENTS

| | | |
|---|---|---|
| EP | 1 610 210 A1 | 12/2005 |
| EP | 1 681 751 A1 | 7/2006 |
| EP | 2 244 120 A1 | 10/2010 |
| JP | 7-325319 A | 12/1995 |
| JP | 2007-156040 A | 6/2007 |
| JP | 2007-158381 | 6/2007 |
| RU | 2 267 183 C2 | 4/2004 |
| SU | 1196791 A | 12/1985 |

* cited by examiner

Primary Examiner — Kent Chang
Assistant Examiner — Ngan Pham Lu
(74) Attorney, Agent, or Firm — Nixon & Vanderhye P.C.

(57) ABSTRACT

A liquid crystal panel with built-in sensors 11 includes, in a pixel array 17, a plurality of pixel circuits 1 and a plurality of optical sensors 2 which are arranged two-dimensionally. Infrared light transmitting filters 3 that allow infrared light to pass therethrough and cut off visible light are provided in respective paths of light entering the optical sensors 2. A backlight 15 including white LEDs 4 and infrared LEDs 5 is provided on a back surface of the liquid crystal panel 11. With this, reflected light of backlight light including infrared light is detected by the optical sensors 2 without receiving the influence of visible light, and thus a touch position is detected with high accuracy, irrespective of display data.

8 Claims, 12 Drawing Sheets

DISPLAY DEVICE HAVING OPTICAL SENSORS

This application is the U.S. national phase of International Application No. PCT/JP2009/052479 filed 16 Feb. 2009 which designated the U.S. and claims priority to JP Patent Application No. 2008-52161 filed 3 Mar. 2008, the entire contents of each of which are hereby incorporated by reference.

TECHNICAL FIELD

The present invention relates to a display device and more particularly to a display device having a plurality of optical sensors provided in a display panel.

BACKGROUND ART

In recent years, electronic devices that can be operated by touching a screen with a finger, a pen, etc., have proliferated. In addition, for a method of detecting a touch position on a display screen, a method is known in which a plurality of optical sensors are provided in a display panel and a shadow image which is created when a finger or the like approaches the screen is detected using the optical sensors. In the method of detecting a shadow image, when the illumination of outside light is low (the surroundings are dark), it becomes difficult to distinguish between a shadow image and a background in an image obtained by the optical sensors and accordingly a touch position may not be able to be detected properly. In view of this, for display devices including a backlight, a method is also known in which a reflection image which is created when backlight light hits a finger is detected using optical sensors.

A display device having a plurality of optical sensors provided in a display panel is described in, for example, Patent Document 1. In addition, Patent Document 2 describes a liquid crystal panel including, as shown in FIG. 21, a pixel portion PP and an infrared detecting portion ISP. The pixel portion PP is provided with a first TFT (T1), a transparent electrode TE, a reflecting electrode RE, etc., and the infrared detecting portion ISP is provided with a capacitor C, a second TFT (T2), etc. The reflecting electrode RE is provided with a transmission window W1 for allowing the transparent electrode TE to be exposed therefrom and an opening window W2 for allowing a pyroelectric thin film PE1 in the capacitor C to be exposed therefrom. The opening window W2 is provided to facilitate the application of infrared radiation which is intentionally provided by a user from outside the liquid crystal panel, to the pyroelectric thin film PE1. In addition, Patent Document 3 describes the provision of a backlight including a non-visible light source that emits non-visible light which can be received by optical sensors, in a liquid crystal display device having optical sensors.

[Patent Document 1] Japanese Laid-Open Patent Publication No. 2007-102154
[Patent Document 2] Japanese Laid-Open Patent Publication No. 2004-264846
[Patent Document 3] Japanese Laid-Open Patent Publication No. 2008-3296

DISCLOSURE OF THE INVENTION

Problems to be Solved by the Invention

However, conventional display devices having optical sensors have a problem that display data is mixed, as noise, in output data from optical sensors, reducing the detection accuracy for a touch position. For example, in a liquid crystal display device having optical sensors, light having passed through a liquid crystal panel enters the optical sensors provided in the liquid crystal panel (see FIG. 5 which will be described later). Hence, the amount of light detected by the optical sensors varies depending on the light transmittance of the liquid crystal panel, and output data from the optical sensors is influenced by display data.

In addition, in a liquid crystal panel that uses the same data signal lines for both writing into pixel circuits and reading from optical sensors, since charges provided to the data signal lines during writing influence read data, output data from the optical sensors is influenced by display data. For such a reason, display data is mixed, as noise, in output data from the optical sensors. In particular, when displayed gradation is dark (e.g., when black display is performed), the amount of light detected by the optical sensors is small, and thus, mixing of display data significantly reduces the detection accuracy for a touch position.

In addition, in the liquid crystal display device having optical sensors described in Patent Document 3, an image obtained by the optical sensors may be influenced by both visible light and non-visible light, causing a problem that the detection accuracy for a touch position is not so high.

An object of the present invention is therefore to provide a display device that can detect a touch position with high accuracy, irrespective of displayed image, without being influenced by visible light included in outside light or a backlight.

Means for Solving the Problems

According to a first aspect of the present invention, there is provided a display device including a plurality of optical sensors, the display device including: a display panel including a plurality of pixel circuits and a plurality of optical sensors which are arranged two-dimensionally; filter portions that are provided in respective paths of light entering the optical sensors and that allow infrared light to pass therethrough and cut off visible light; and a backlight that is provided on a back surface side of the display panel and that emits at least light passing through the filter portions.

According to a second aspect of the present invention, in the first aspect of the present invention, the pixel circuits and the optical sensors are formed of polysilicon, and the backlight emits infrared light with a shorter wavelength than a fundamental absorption edge wavelength of silicon.

According to a third aspect of the present invention, in the first aspect of the present invention, the backlight emits infrared light having a peak wavelength in an absorption spectrum of an atmosphere.

According to a fourth aspect of the present invention, in the third aspect of the present invention, the backlight emits infrared light having a peak wavelength in a range of 850 nm to 960 nm.

According to a fifth aspect of the present invention, in the first aspect of the present invention, the backlight includes a first luminous element that emits visible light; a second luminous element that emits infrared light; a light guide plate; and a reflection sheet that is provided on one surface of the light guide plate and that allows infrared light to pass therethrough and reflects visible light, the first luminous element is arranged along a side surface of the light guide plate, and the second luminous element is arranged on a side of the surface of the light guide plate where the reflection sheet is provided.

According to a sixth aspect of the present invention, in the first aspect of the present invention, the backlight includes a first luminous element that emits visible light; and a second luminous element that emits infrared light, and the first and second luminous elements are arranged on a same substrate or are enclosed in a same package.

According to a seventh aspect of the present invention, in the first aspect of the present invention, the backlight includes, as a light source, only a luminous element that emits infrared light.

According to an eighth aspect of the present invention, in the first aspect of the present invention, the filter portions have a pass band suitable for infrared light emitted from the backlight, and each of the optical sensors is arranged in a position in which the optical sensor overlaps a corresponding filter portion when viewed in a direction perpendicular to the pixel circuits.

According to a ninth aspect of the present invention, in the eighth aspect of the present invention, the filter portions have a pass band having an upper limit and a lower limit suitable for infrared light emitted from the backlight.

According to a tenth aspect of the present invention, in the first aspect of the present invention, the display panel further includes a filter that allows visible light to pass therethrough and cuts off light with longer wavelengths than infrared light emitted from the backlight.

According to an eleventh aspect of the present invention, in the first aspect of the present invention, the display panel further includes a filter whose pass band includes all or part of a visible light range and a wavelength range of infrared light emitted from the backlight.

Effects of the Invention

According to the first aspect of the present invention, since the filter portions that allow infrared light to pass therethrough and cut off visible light are provided in the respective paths of light entering the optical sensors, an image obtained by the optical sensors is not influenced by visible light included in outside light or backlight light, enabling to detect reflected light of infrared light emitted from the backlight by the optical sensors. Accordingly, infrared light reflected off a matter present in the vicinity of the front surface of the display panel is detected and a touch position can be detected with high accuracy, based on an image that is not influenced by visible light included in large amount in outside light or other light sources (backlight). In addition, in the display panel that allows infrared light to pass therethrough more easily than visible light, by increasing the light reception sensitivity of the display panel, a touch position can be detected with high accuracy. In addition, even if display data is changed, the transmittance of infrared light does not change and thus a touch position can be detected irrespective of display data. Furthermore, by reducing the luminance of the backlight by an amount corresponding to the increase in light reception sensitivity, the power consumption of the backlight can be reduced.

According to the second aspect of the present invention, when the pixel circuits and the optical sensors are formed of polysilicon having the light reception sensitivity of infrared light, infrared light emitted from the backlight is detected by the optical sensors, enabling to detect a touch position based on a result of the detection.

According to the third or fourth aspect of the present invention, a display device that can detect a touch position with high accuracy, irrespective of display data can be configured using a backlight that emits infrared light having a peak wavelength in the absorption spectrum of the atmosphere (more preferably, in a range of 850 nm to 960 nm). In addition, by providing filters whose pass band includes the wavelength range of light emitted from the backlight, in the respective paths of light entering the optical sensors, the influence of sunlight exerted on an image obtained by the optical sensors is reduced, enabling to detect a touch position with higher accuracy.

According to the fifth aspect of the present invention, by adding a second luminous element to a backlight that emits visible light, a backlight that emits both visible light and infrared light can be configured using a conventional backlight as it is.

According to the sixth aspect of the present invention, by arranging a luminous element that emits visible light and a luminous element that emits infrared light on the same substrate or enclosing such luminous elements in the same package, a small-size backlight that emits both visible light and infrared light can be configured.

According to the seventh aspect of the present invention, by providing a backlight that emits only infrared light, a reflective-type display device can be configured that can detect a touch position with high accuracy, irrespective of display data.

According to the eighth aspect of the present invention, by arranging each optical sensor in a position in which the optical sensor overlaps a corresponding filter portion having a pass band suitable for infrared light emitted from the backlight, when viewed in a direction perpendicular to the pixel circuits, an image obtained by the optical sensors is prevented from being influenced by visible light, enabling to detect a touch position with high accuracy.

According to the ninth aspect of the present invention, by arranging each optical sensor in a position in which the optical sensor overlaps a band-pass filter having an upper limit and a lower limit suitable for infrared light emitted from the backlight, when viewed in a direction perpendicular to the pixel circuits, an image obtained by the optical sensors is prevented from being influenced by visible light, and light other than desired infrared light is reduced, enabling to detect a touch position with high accuracy.

According to the tenth aspect of the present invention, by providing a filter that allows visible light to pass therethrough and cuts off light with longer wavelengths than infrared light emitted from the backlight, light other than visible light required for display and desired infrared light is removed, enabling to detect a touch position with high accuracy. In particular, when each optical sensor is arranged in a position in which the optical sensor overlaps a corresponding filter portion having a pass band suitable for infrared light emitted from the backlight, when viewed in a direction perpendicular to the pixel circuits, band-pass filters having an upper limit and a lower limit suitable for infrared light emitted from the backlight can be easily formed in the respective paths of light entering the optical sensors.

According to the eleventh aspect of the present invention, by providing a filter whose pass band includes all or part of the visible light range and the wavelength range of infrared light emitted from the backlight, light other than visible light required for display and desired infrared light is removed, enabling to detect a touch position with high accuracy.

DESCRIPTION OF THE REFERENCE NUMERALS

Figure 1:
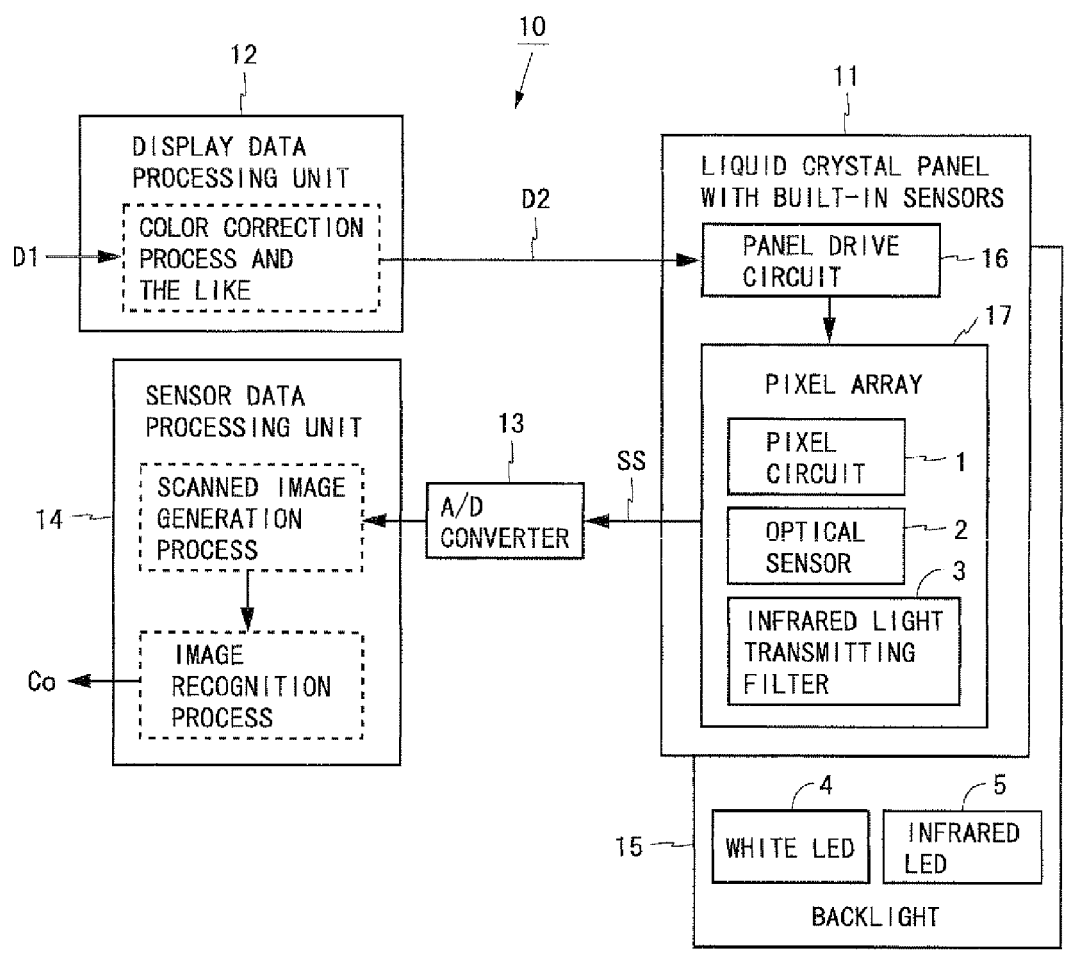
FIG. 1 is a block diagram showing a configuration of a liquid crystal display device according to a first embodiment of the present invention.

1 Pixel circuit
2 Optical sensor
3 Infrared light transmitting filter
4 White LED
5 Infrared LED
6 Resin package
7 Surface filter
10 and 18 Liquid crystal display device
11, 81, and 82 Liquid crystal panel with built-in sensors
12 Display data processing unit
13 A/D converter
14 Sensor data processing unit
15 and 19 Backlight
16 Panel drive circuit
17 Pixel array
24 Photodiode
41 Glass substrate
42 Liquid crystal layer
43 Light-shielding film
44 Color filter
51 Backlight light
52 Outside light
53 Object
64, 68, and 74 Light guide plate
65, 70, and 72 Reflection sheet

BEST MODE FOR CARRYING OUT THE INVENTION

First Embodiment

FIG. 1 is a block diagram showing a configuration of a liquid crystal display device according to a first embodiment of the present invention. A liquid crystal display device 10 shown in FIG. 1 includes a liquid crystal panel with built-in sensors 11, a display data processing unit 12, an A/D converter 13, a sensor data processing unit 14, and a backlight 15. The liquid crystal panel with built-in sensors 11 (hereinafter, referred to as the liquid crystal panel 11) includes a panel drive circuit 16 and a pixel array 17. The pixel array 17 includes a plurality of pixel circuits 1 and a plurality of optical sensors 2 which are arranged two-dimensionally. Infrared light transmitting filters 3 that allow infrared light to pass therethrough and cut off visible light are provided in respective paths of light entering the optical sensors 2.

Display data D1 is inputted to the liquid crystal display device 10 from an external source. The display data processing unit 12 performs, if necessary, a color correction process, a frame rate conversion process, etc., on the display data D1 and outputs display data D2. The panel drive circuit 16 writes voltages according to the display data D2 into the respective pixel circuits 1 of the liquid crystal panel 11. With this, an image based on the display data D2 is displayed on the liquid crystal panel 11.

The backlight 15 irradiates a back surface of the liquid crystal panel 11 with light (backlight light), based on a power supply voltage supplied from a backlight power supply circuit (not shown). The backlight 15 includes white LEDs (Light Emitting Diodes) 4 that emit white light (visible light); and infrared LEDs 5 that emit infrared light. Note that instead of the white LEDs 4 any luminous element that emits visible light may be used, and instead of the infrared LEDs 5 any luminous element that emits infrared light may be used. For example, instead of the white LEDs 4, red, green and blue LEDs may be used in combination or cold cathode fluorescent lamps (CCFLs) may be used.

The panel drive circuit 16 performs the operation of reading voltages according to the amounts of received light, from the respective optical sensors 2, in addition to the operation of writing voltages into the respective pixel circuits 1. Output signals from the respective optical sensors 2 are outputted external to the liquid crystal panel 11, as sensor output signals SS. The A/D converter 13 converts the analog sensor output signals SS to digital signals. The sensor data processing unit 14 generates a digital image (hereinafter, referred to as a scanned image), based on the digital signals outputted from the A/D converter 13. The scanned image may include an image of a matter to be detected (e.g., a finger, a pen, etc.; hereinafter, referred to as an object) which is present in the vicinity of a front surface of the liquid crystal panel 11. The sensor data processing unit 14 performs an image recognition process on the scanned image to detect an object and thereby determines an object position in the scanned image, and outputs coordinate data G0 representing a touch position.

Figure 2:
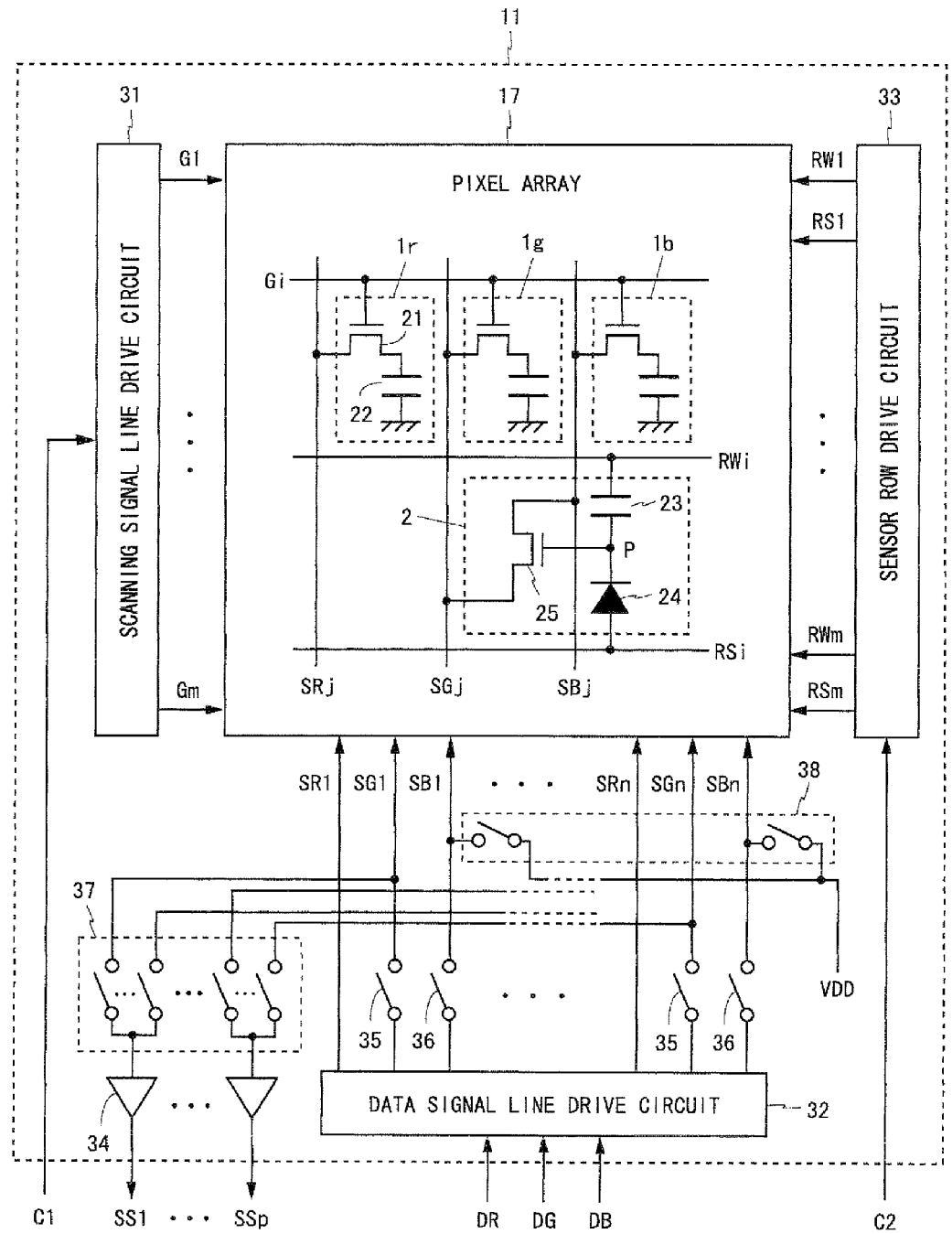
FIG. 2 is a block diagram showing a detailed configuration of a liquid crystal panel of the device shown in FIG. 1.

FIG. 2 is a block diagram showing a detailed configuration of the liquid crystal panel 11. As shown in FIG. 2, the pixel array 17 includes m scanning signal lines G1 to Gm; 3n data signal lines SR1 to SRn, SG1 to SGn, and SB1 to SBn; and (m×3n) pixel circuits 1. In addition to them, the pixel array 17 includes (m×n) optical sensors 2; m sensor read lines RW1 to RWm; and m sensor reset lines RS1 to RSm. The liquid crystal panel 11 is formed using polysilicon.

The scanning signal lines G1 to Gm are arranged parallel to one another. The data signal lines SR1 to SRn, SG1 to SGn, and SB1 to SBn are arranged parallel to one another so as to vertically intersect the scanning signal lines G1 to Gm. The sensor read lines RW1 to RWm and the sensor reset lines RS1 to RSm are arranged parallel to the scanning signal lines G1 to Gm.

The pixel circuits 1 are respectively provided near intersections of the scanning signal lines G1 to Gm and the data signal lines SR1 to SRn, SG1 to SGn, and SB1 to SBn. The pixel circuits 1 as a whole are arranged two-dimensionally such that m pixel circuits 1 are arranged in a column direction (a vertical direction in FIG. 2) and 3n pixel circuits 1 are arranged in a row direction (a horizontal direction in FIG. 2). The pixel circuits 1 are classified into R pixel circuits 1$r$, G pixel circuits 1$g$, and B pixel circuits 1$b$, depending on the color of a color filter provided. The three types of pixel circuits are arranged side by side in the row direction in the order of R, G, and B, and three pixel circuits form one pixel.

Each pixel circuit 1 includes a TFT (Thin Film Transistor) 21 and a liquid crystal capacitance 22. A gate terminal of the TFT 21 is connected to a corresponding scanning signal line Gi (i is an integer between 1 and m inclusive), a source terminal is connected to a corresponding one of the data signal lines SRj, SGj, and SBj (j is an integer between 1 and n inclusive), and a drain terminal is connected to one electrode of the liquid crystal capacitance 22. To the other electrode of the liquid crystal capacitance 22 is applied a common electrode voltage. The data signal lines SG1 to SGn connected to the G pixel circuits 1$g$ are hereinafter referred to as the G data signal lines and the data signal lines SB1 to SBn connected to the B pixel circuits 1$b$ as the B data signal lines. Note that each pixel circuit 1 may include an auxiliary capacitance.

The light transmittance of a pixel circuit 1 (the luminance of a sub-pixel) is determined by a voltage written into the pixel circuit 1. To write a certain voltage into a pixel circuit 1 connected to a scanning signal line G1 and a data signal line SXj (X is any one of R, G, and B), a high-level voltage (a voltage that places a TFT 21 in an on state) is applied to the scanning signal line Gi and a voltage to be written is applied to the data signal line SXj. By writing a voltage according to display data D2 into the pixel circuit 1, the luminance of the sub-pixel can be set to a desired level.

Each optical sensor 2 includes a capacitor 23, a photodiode 24, and a sensor preamplifier 25, and is provided for each pixel. One electrode of the capacitor 23 is connected to a cathode terminal of the photodiode 24 (this connecting point is hereinafter referred to as a node P). The other electrode of the capacitor 23 is connected to a corresponding sensor read line RWi and an anode terminal of the photodiode 24 is connected to a corresponding sensor reset line RSi. The sensor preamplifier 25 is configured by a TFT having a gate terminal connected to the node P and having a drain terminal connected to a corresponding B data signal line SBj and having a source terminal connected to a corresponding G data signal line SGj.

To detect the amount of light by an optical sensor 2 connected to a sensor read line RWi, a B data signal line SBj, etc., a predetermined voltage is applied to the sensor read line RWi and a sensor reset line RSi and a power supply voltage VDD is applied to the B data signal line SBj. When, after the predetermined voltage is applied to the sensor read line RWi and the sensor reset line RSi, light enters a photodiode 24, a current according to the amount of entered light flows through the photodiode 24 and accordingly the voltage at a node P decreases by an amount corresponding to the amount of current having flown through. By applying, at that timing, a high voltage to the sensor read line RWi to bring up the voltage at the node P and set the gate voltage of a sensor preamplifier 25 to a threshold value or more and then applying a power supply voltage VDD to the B data signal line SBj, the voltage at the node P is amplified by the sensor preamplifier 25 and the amplified voltage is outputted to a G data signal line SGj. Therefore, based on the voltage of the G data signal line SGj, the amount of light detected by the optical sensor 2 can be determined.

Around the pixel array 17 are provided a scanning signal line drive circuit 31, a data signal line drive circuit 32, a sensor row drive circuit 33, p sensor output amplifiers 34 (p is an integer between 1 and n inclusive), and a plurality of switches 35 to 38. The scanning signal line drive circuit 31, the data signal line drive circuit 32, and the sensor row drive circuit 33 correspond to the panel drive circuit 16 in FIG. 1.

The data signal line drive circuit 32 has 3n output terminals for the respective 3n data signal lines. The switches 35 are respectively provided between the G data signal lines SG1 to SGn and n output terminals provided for the respective G data signal lines SG1 to SGn, and the switches 36 are respectively provided between the B data signal lines SB1 to SBn and n output terminals provided for the respective B data signal lines SB1 to SBn. The G data signal lines SG1 to SGn are divided into groups, each including p G data signal lines. One switch 37 is provided between a k-th G data signal line in each group (k is an integer between 1 and p inclusive) and an input terminal of a k-th sensor output amplifier 34. One switch 38 is provided between each of the B data signal lines SB1 to SBn and a power supply voltage VDD. The respective numbers of the switches 35 to 38 included in FIG. 2 are all n.

In the liquid crystal display device 10, one frame time is divided into a display period during which signals (voltage signals according to display data) are written into the respective pixel circuits and a sensing period during which signals (voltage signals according to the amounts of received light) are read from the respective optical sensors. The circuits shown in FIG. 2 perform different operations for the display period and the sensing period. During the display period, the switches 35 and 36 are placed in an on state and the switches 37 and 38 are placed in an off state. On the other hand, during the sensing period, the switches 35 and 36 are placed in an off state, the switches 38 are placed in an on state, and the switches 37 are placed in an on state in a time-division manner such that the G data signal lines SG1 to SGn are connected to the input terminals of the sensor output amplifiers 34 group by group in turn.

During the display period, the scanning signal line drive circuit 31 and the data signal line drive circuit 32 operate. The scanning signal line drive circuit 31 selects, every line time, one scanning signal line from among the scanning signal lines G1 to Gm according to a timing control signal C1, and applies a high-level voltage to the selected scanning signal line and applies a low-level voltage to the other scanning signal lines. The data signal line drive circuit 32 drives the data signal lines SR1 to SRn, SG1 to SGn, and SB1 to SBn by a line sequential system, based on display data DR, DG, and DB outputted from the display data processing unit 12. More specifically, the data signal line drive circuit 32 stores at least a portion of each of the display data DR, DC, and DB for one row and applies, every line time, voltages according to the portions of the display data for one row to the data signal lines SR1 to SRn, SG1 to SGn, and SB1 to SBn. Note that the data signal line drive circuit 32 may drive the data signal lines SR1 to SRn, SG1 to SGn, and SB1 to SBn by a dot sequential system.

During the sensing period, the sensor row drive circuit 33 and the sensor output amplifiers 34 operate. The sensor row drive circuit 33 selects, every line time, one each from the sensor read lines RW1 to RWm and the sensor reset lines RS1 to RSm according to a timing control signal C2, and applies a predetermined read voltage and a predetermined reset voltage to the selected sensor read line and sensor reset line, respectively, and applies a voltage different than those applied upon selection, to the other signal lines. Note that typically the length of one line time differs between the display period and the sensing period. The sensor output amplifiers 34 amplify voltages selected by their corresponding switches 37 and output the amplified voltages as sensor output signals SS1 to SSp.

Figure 3:
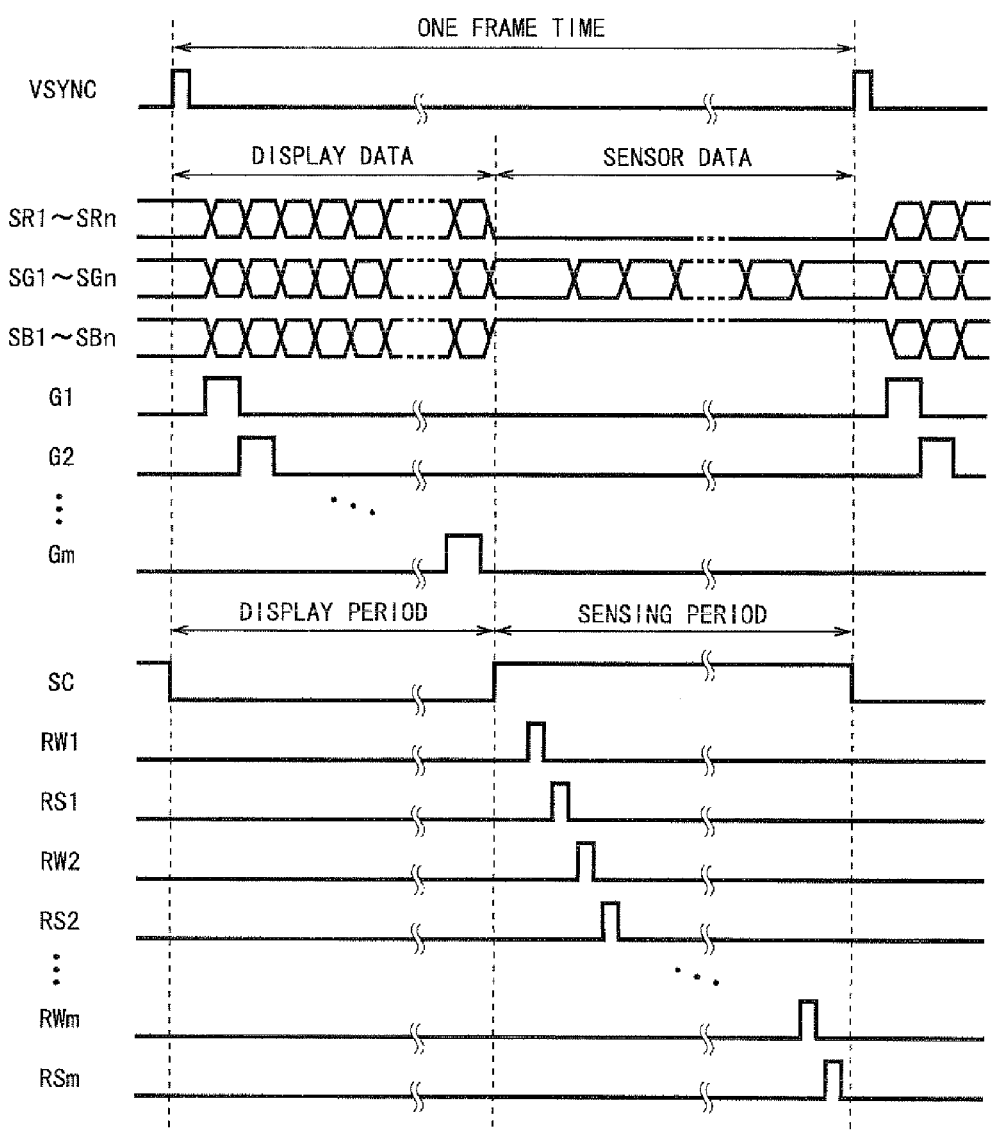
FIG. 3 is a timing chart for the device shown in FIG. 1.

FIG. 3 is a timing chart for the liquid crystal display device 10. As shown in FIG. 3, a vertical synchronizing signal VSYNC goes to a high level every frame time. One frame time is divided into a display period and a sensing period. A sense signal SC is a signal indicating whether the current period is the display period or the sensing period. The sense signal SC is at a low level during the display period and is at a high level during the sensing period.

During the display period, the switches 35 and 36 are placed in an on state and all the data signal lines SR1 to SRn, SG1 to SGn, and SB1 to SBn are connected to the data signal line drive circuit 32. During the display period, first, the voltage of the scanning signal line G1 goes to a high level. Then, the voltage of the scanning signal line G2 goes to a high level and thereafter the voltages of the scanning signal lines G3 to Gm go to a high level in turn. While the voltage of a scanning signal line Gi is at a high level, voltages to be written into 3n pixel circuits 1 connected to the scanning signal line Gi are applied to the data signal lines SR1 to SRn, SG1 to SGn, and SB1 to SBn.

During the sensing period, the switches 38 are placed in an on state and the switches 37 are placed in an on state in a time-division manner. Hence, a power supply voltage VDD is fixedly applied to the B data signal lines SB1 to SBn, and the G data signal lines SG1 to SGn are connected to the input terminals of the sensor output amplifiers 34 in a time-division manner. During the sensing period, first, the sensor read line RW1 and the sensor reset line RS1 are selected. Then, the sensor read line RW2 and the sensor reset line RS2 are selected and thereafter the sensor read lines RW3 to RWm and the sensor reset lines RS3 to RSm are selected pair by pair in turn. A read voltage and a reset voltage are applied to the selected sensor read line and sensor reset line, respectively. While a sensor read line RWi and a sensor reset line RSi are selected, voltages according to the amounts of light detected by respective n optical sensors 2 connected to the sensor read line RWi are outputted to the G data signal lines SG1 to SGn, respectively.

Figure 4:
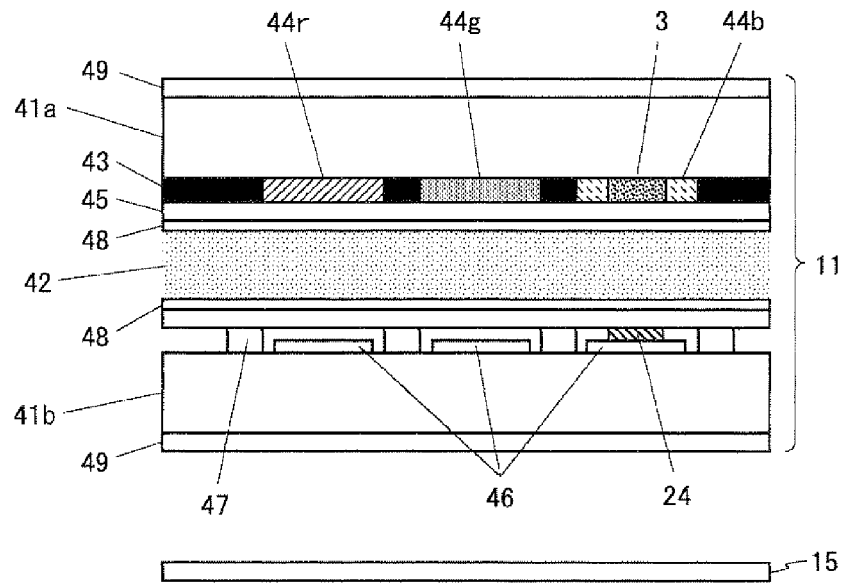
FIG. 4 is a diagram showing a cross section of the liquid crystal panel and an arrangement position of a backlight of the device shown in FIG. 1.

FIG. 4 is a diagram showing a cross section of the liquid crystal panel 11 and an arrangement position of the backlight 15. The liquid crystal panel 11 has a structure in which a liquid crystal layer 42 is sandwiched between two glass substrates 41a and 41b. One glass substrate 41a has a light-shielding film 43, color filters 44r, 44g, and 44b of three colors, a counter electrode 45, etc., provided thereon. The other glass substrate 41b has pixel electrodes 46, data signal lines 47, optical sensors 2, etc., provided thereon. Alignment films 48 are provided on respective surfaces of the glass substrates 41a and 41b that face each other, and polarizing plates 49 are provided on the respective other surfaces. Of the two surfaces of the liquid crystal panel 11, a surface on the side of the glass substrate 41a serves as the front surface and a surface on the side of the glass substrate 41b serves as the back surface. The backlight 15 is provided on the back surface side of the liquid crystal panel 11. In the example shown in FIG. 4, a photodiode 24 included in an optical sensor 2 is provided near a pixel electrode 46 where a blue color filter 44b is provided. An infrared light transmitting filter 3 is provided within the blue color filter 44b.

The infrared light transmitting filter 3 does not necessarily need to completely cut off visible light, provided that the infrared light transmitting filter 3 is provided for the purpose of allowing infrared light to pass therethrough and cutting off visible light, and thus, the infrared light transmitting filter 3 may allow, for example, on the order of several tens of percent of visible light to pass therethrough. In addition, the infrared light transmitting filter 3 may allow not only infrared light but also light having wavelengths longer than the visible light to pass therethrough. Alternatively, the infrared light transmitting filter 3 may be formed of a light-shielding film. Alternatively, the infrared light transmitting filter 3 may have a configuration in which materials used for the color filters 44r, 44g, and 44b are overlaid. Overlaid combinations include a combination of the red color filter 44r and the green color filter 44g, a combination of the red color filter 44r and the blue color filter 44b, a combination of the green color filter 44g and the blue color filter 44b, and a combination of the red color filter 44r, the green color filter 44g, and the blue color filter 44b. In the case of overlaying, the thickness of color filters may be changed from that of other pixels.

Figure 5:
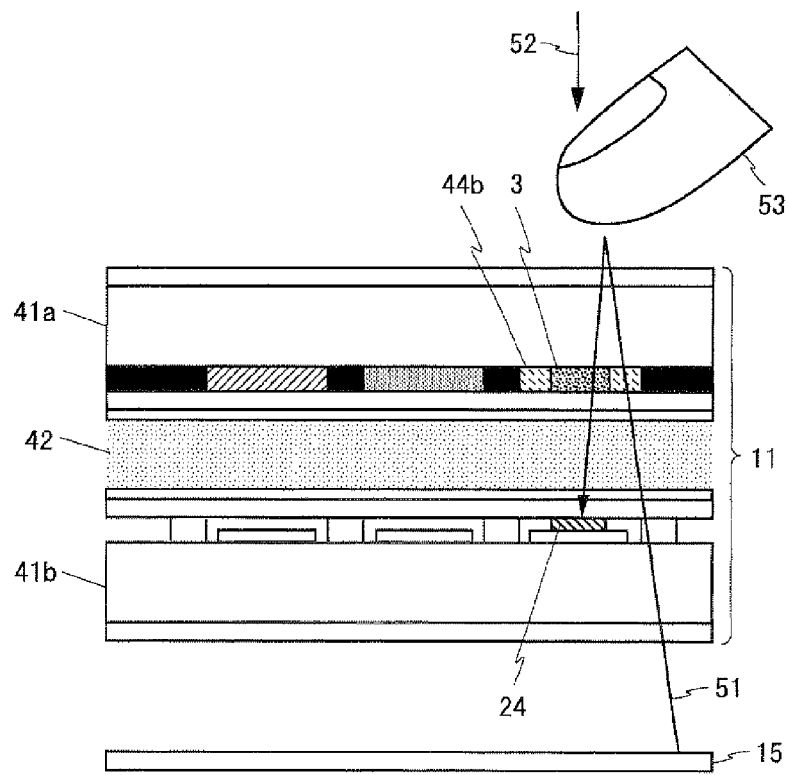
FIG. 5 is a diagram showing the principle of a method of detecting a reflection image in the device shown in FIG. 1.

When the liquid crystal display device 10 detects a touch position on a display screen, the liquid crystal display device 10 uses a method of detecting a reflection image. FIG. 5 is a diagram showing the principle of the method of detecting a reflection image. In this method, an optical sensor 2 including a photodiode 24 detects reflected light of backlight light 51. More specifically, the backlight light 51 emitted from the backlight 15 passes through and gets out of the liquid crystal panel 11 through the front surface of the liquid crystal panel 11. At this time, when an object 53 such as a finger is present in the vicinity of the front surface of the liquid crystal panel 11, the backlight light 51 is reflected off the object 53. For example, the balls of human fingers reflect light well, including infrared light. The reflected light of the backlight light 51 passes through the glass substrate 41a, the liquid crystal layer 42, etc., and enters the optical sensor 2. Thus, using the optical sensor 2, a reflection image of the object 53 created by the backlight light 51 can be detected.

The optical sensor 2 including the photodiode 24 detects outside light 52 in addition to reflected light of the backlight light 51. More specifically, the outside light 52 having entered the liquid crystal panel 11 passes through the glass substrate 41a, the liquid crystal layer 42, etc., and enters the photodiode 24. At this time, when the object 53 is present in the vicinity of the front surface of the liquid crystal panel 11, the outside light 52 to enter the photodiode 24 is blocked by the object 53. Thus, when the outside light 52 is bright, a reflection image of the object 53 created by the backlight light 51 and a shadow image of the object 53 created by the outside light 52 are obtained simultaneously.

Figure 6A:
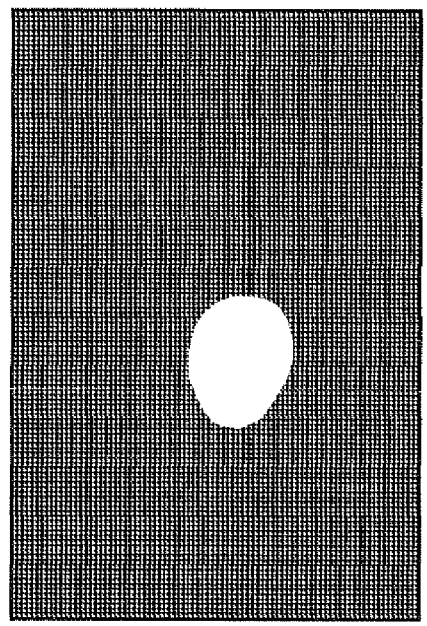
FIG. 6A is a diagram showing an example of a scanned image obtained by the device shown in FIG. 1.
Figure 6B:
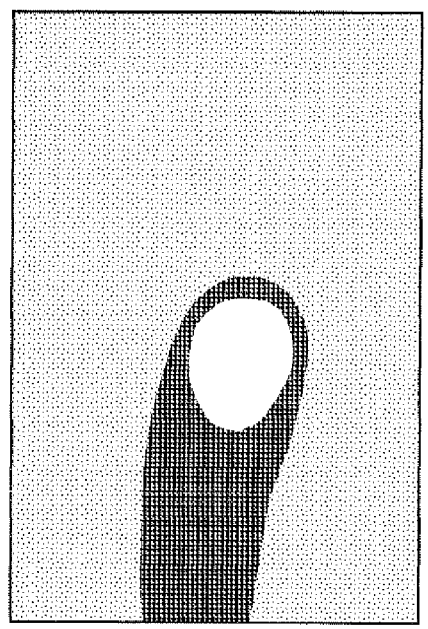
FIG. 6B is a diagram showing another example of the scanned image obtained by the device shown in FIG. 1.

FIGS. 6A and 6B are diagrams showing examples of a scanned image including a finger image. A scanned image shown in FIG. 6A is an image obtained when the outside light 52 is dark, and includes a reflection image of the ball of a finger. A scanned image shown in FIG. 6B is an image obtained when the outside light 52 is bright, and includes a shadow image of a finger and a reflection image of the ball of the finger. The sensor data processing unit 14 performs an image recognition process on such scanned images and outputs coordinate data Co representing a touch position.

The details of the backlight 15 including the infrared LEDs 5 will be described below. As described above, the infrared light transmitting filters 3 are provided in the respective paths of light entering the optical sensors 2. Hence, for the infrared LEDs 5, infrared LEDs that emit infrared light in a wavelength range that passes through the infrared light transmitting filters 3 are used. For example, for the infrared LEDs 5, infrared LEDs that emit infrared light with a shorter wavelength than the fundamental absorption edge wavelength of silicon (about 1100 nm) are used. By using such infrared LEDs, when the pixel circuits 1 and the optical sensors 2 are formed of polysilicon, infrared light emitted from the infrared LEDs 5 can be detected by the optical sensors 2.

Figure 7:
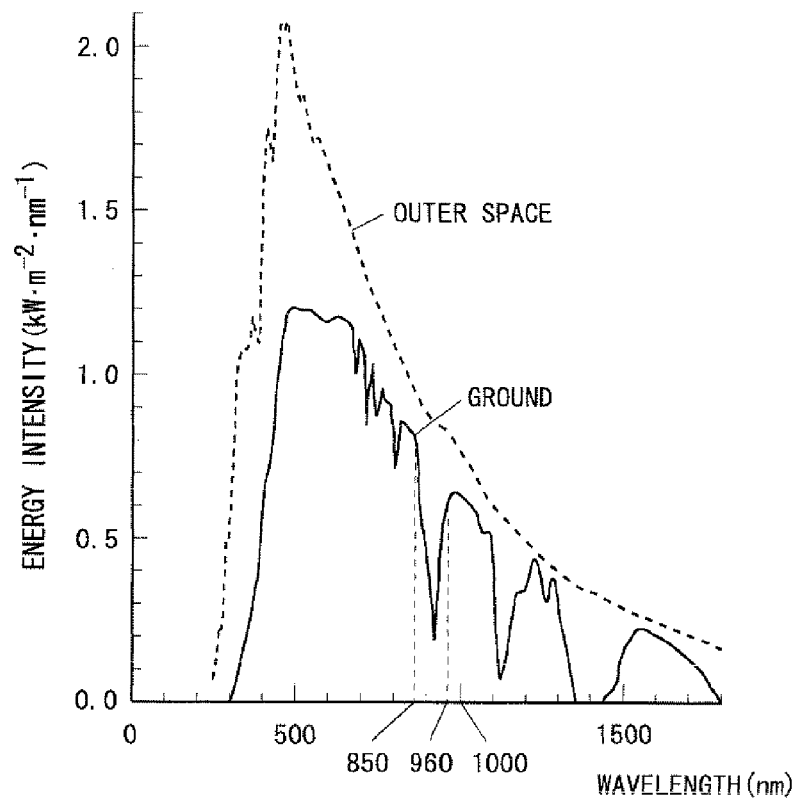
FIG. 7 is a diagram showing a general sunlight spectrum.

Alternatively, for the infrared LEDs 5, infrared LEDs that emit infrared light having a peak wavelength in the absorption spectrum of the atmosphere may be used. More preferably, infrared LEDs that emit infrared light having a peak wavelength in a range of 850 nm to 960 nm may be used. FIG. 7 is a diagram showing a general sunlight spectrum. The absorption spectrum of the atmosphere refers to a spectrum where sunlight is attenuated by the atmosphere, and specifically refers to a wavelength range of from 780 nm to 820 nm with an attenuation peak of 800 nm, a wavelength range of from 850 nm to 960 nm with an attenuation peak of 920 nm, etc. In this wavelength range, sunlight is attenuated by scattering attenuation by air having nitrogen and oxygen molecules as the main components and aerosol, absorption by water vapor, or absorption by ozone, oxygen molecules, and carbon dioxide.

Sunlight is attenuated while passing through the atmosphere due to the above-described atmospheric absorption, and thus is weaker on the ground than outer space. In particular, infrared light in a wavelength range of from 850 nm to 960 nm is absorbed by water vapor in the atmosphere and thus is significantly attenuated. When the infrared LEDs 5 that emit infrared light in a wavelength range where sunlight is thus weak are used, by providing band-pass filters whose pass band includes the wavelength range of infrared light, in the respective paths of light entering the optical sensors 2, the influence of sunlight exerted on a scanned image is reduced, enabling to detect a touch position with high accuracy.

FIGS. 8 to 12 are diagrams showing first to fifth exemplary configurations of the backlight 15, respectively. In backlights 15a to 15e shown in FIGS. 8 to 12, two lens sheets 61 and 62 and a diffusion sheet 63 are provided on one surface of a light guide plate 64 or 74, and a reflection sheet 65 or 72 is provided on the other surface.

Figure 8:
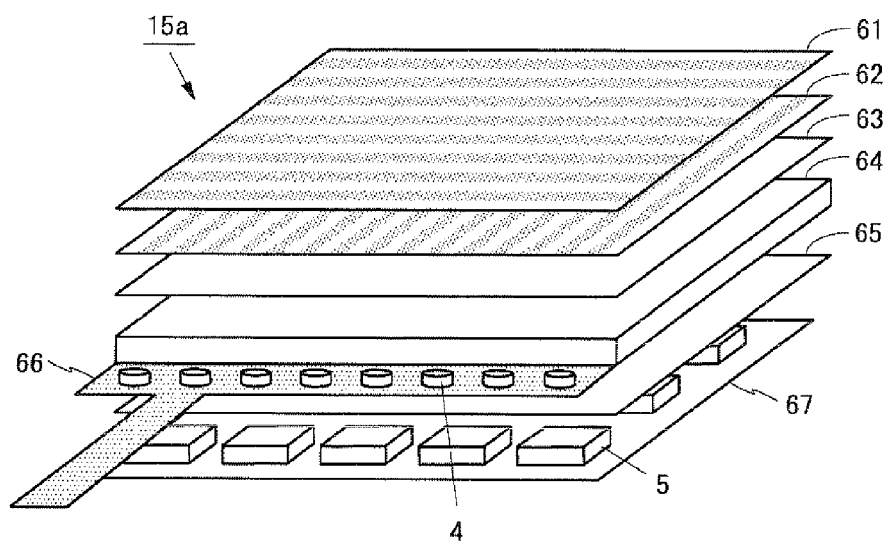
FIG. 8 is a diagram showing a first exemplary configuration of the backlight of the device shown in FIG. 1.
Figure 9:
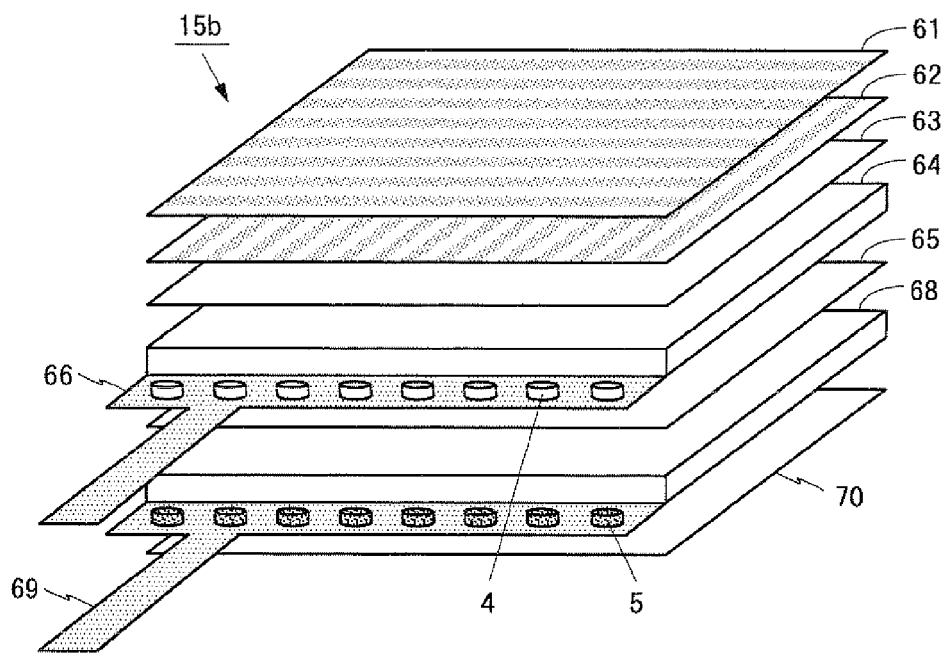
FIG. 9 is a diagram showing a second exemplary configuration of the backlight of the device shown in FIG. 1.

In the backlights 15a and 15b shown in FIGS. 8 and 9, a flexible printed circuit board 66 having white LEDs 4 arranged thereon one-dimensionally is provided at a side surface of the light guide plate 64, and an infrared light source is provided on the side of the surface of the light guide plate 64 where the reflection sheet 65 is provided. In the backlight 15a, a circuit board 67 having, as an infrared light source, infrared LEDs 5 arranged thereon two-dimensionally is provided. In the backlight 15b, an infrared light source including a light guide plate 68, a flexible printed circuit board 69 having infrared LEDs 5 arranged thereon one-dimensionally (which is provided at a side surface of the light guide plate 68), and a reflection sheet 70 is provided. For the reflection sheet 65, a reflection sheet that allows infrared light to pass therethrough and reflects visible light (e.g., a reflection sheet formed of a polyester-based resin) is used. For the reflection sheet 70, a reflection sheet that reflects infrared light is used. By thus adding the infrared light source to the backlight that emits visible light, a backlight 15 that emits both visible light and infrared light can be configured using a conventional backlight as it is.

Figure 10:
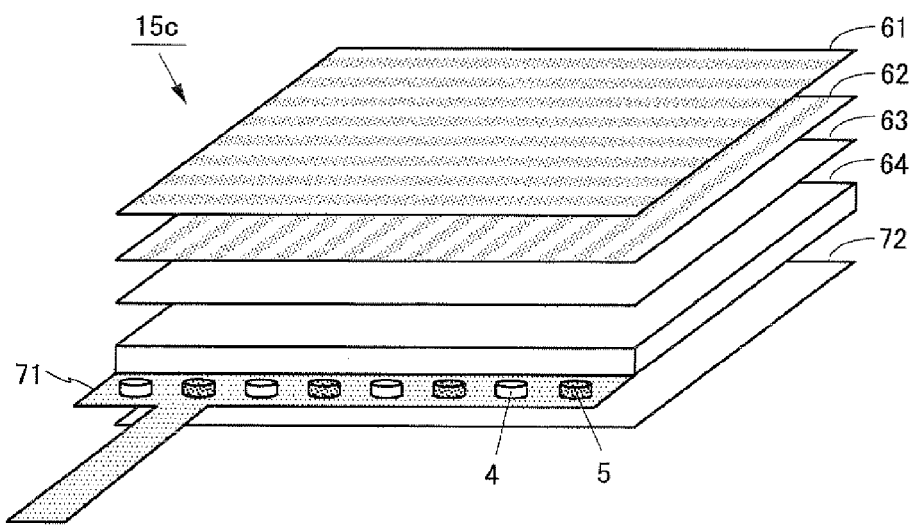
FIG. 10 is a diagram showing a third exemplary configuration of the backlight of the device shown in FIG. 1.

In the backlight 15c shown in FIG. 10, a flexible printed circuit board 71 having a mixture of white LEDs 4 and infrared LEDs 5 arranged thereon one-dimensionally is provided at a side surface of the light guide plate 64. The two types of LEDs are arranged on the flexible printed circuit board 71, for example, alternately. For the reflection sheet 72, a reflection sheet that reflects both visible light and infrared light is used. By thus arranging a mixture of the white LEDs 4 and the infrared LEDs 5 along a side surface of the light guide plate 64, a backlight 15 can be configured that has the same structure as conventional backlights and that emits both visible light and infrared light.

Figure 11:
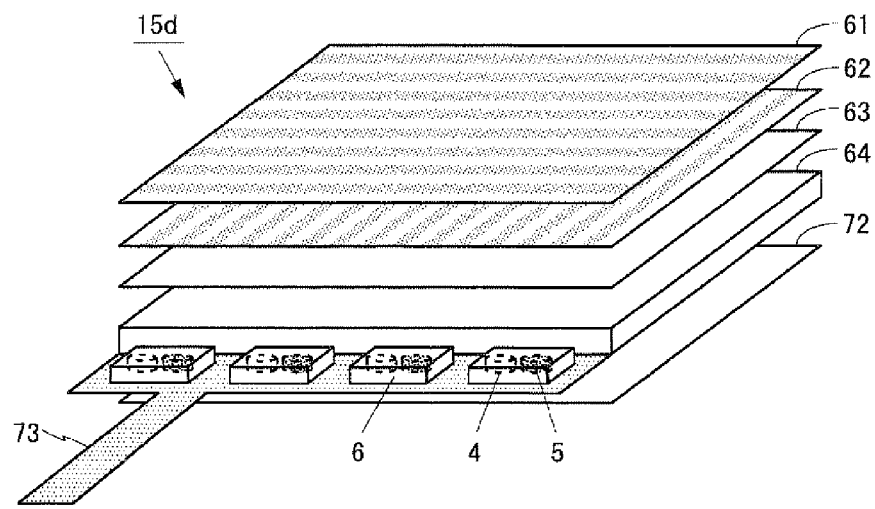
FIG. 11 is a diagram showing a fourth exemplary configuration of the backlight of the device shown in FIG. 1.

In the backlight 15d shown in FIG. 11, a flexible printed circuit board 73 having resin packages 6, each of which encloses therein a white LED 4 and an infrared LED 5 together, arranged thereon one-dimensionally is provided at a side surface of the light guide plate 64. By thus enclosing a white LED 4 and an infrared LED 5 in one resin package 6, a large number of LED luminous elements can be arranged in a narrow space. Note that in one resin package 6 one white LED 4 and one infrared LED 5 may be enclosed or a plurality of white LEDs 4 and a plurality of infrared LEDs 5 may be enclosed. Alternatively, a plurality of chips, each of which includes white LEDs 4, and a plurality of chips, each of which includes infrared LEDs 5, may be arranged on the same board.

Figure 12:
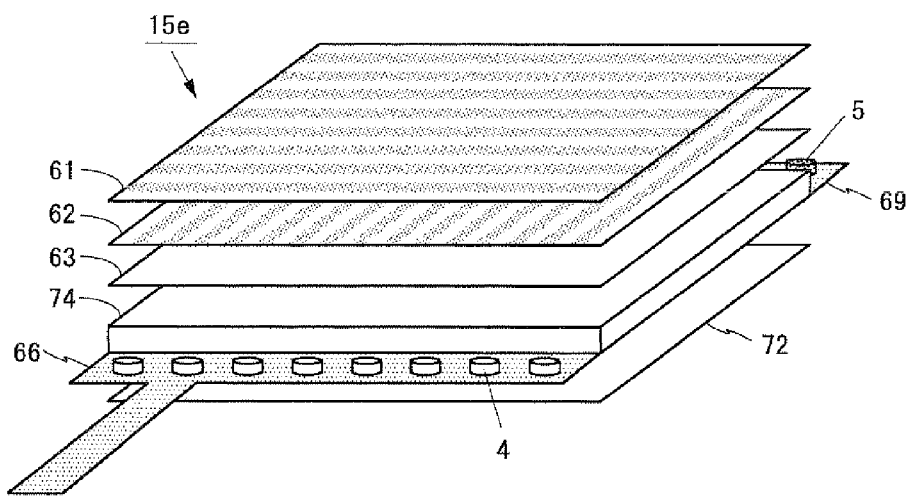
FIG. 12 is a diagram showing a fifth exemplary configuration of the backlight of the device shown in FIG. 1.
Figure 13:
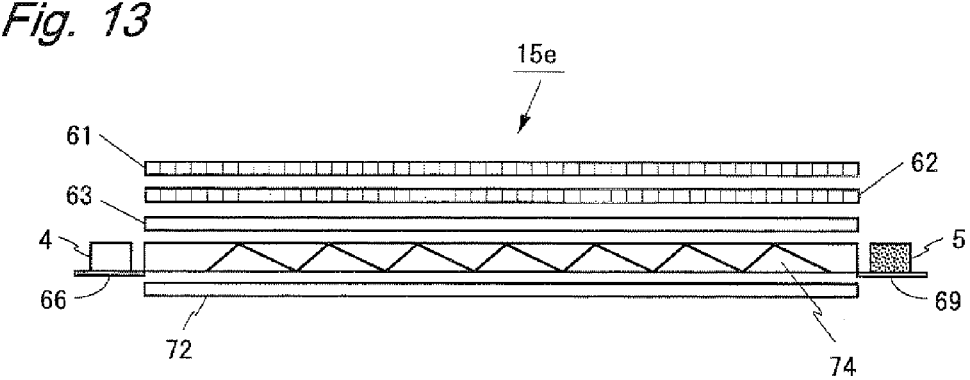
FIG. 13 is a cross-sectional view of the backlight shown in FIG. 12.

In the backlight 15e shown in FIG. 12, a flexible printed circuit board 66 having white LEDs 4 arranged thereon one-dimensionally is provided at one side surface of the light guide plate 74, and a flexible printed circuit board 69 having infrared LEDs 5 arranged thereon one-dimensionally is provided at a opposing side surface of the light guide plate 74. FIG. 13 is a cross-sectional view of the backlight 15e. The light guide plate 74 is processed such that white light entering from one side surface and infrared light entering from the opposing side surface propagate therethrough. By thus separately arranging the white LEDs 4 and the infrared LEDs 5 along two side surfaces of the light guide plate 74, a backlight 15 can be configured in which the same light guide plate is used by the two types of LEDs and other backlight members are shared therebetween and which emits both visible light and infrared light.

Figure 14:
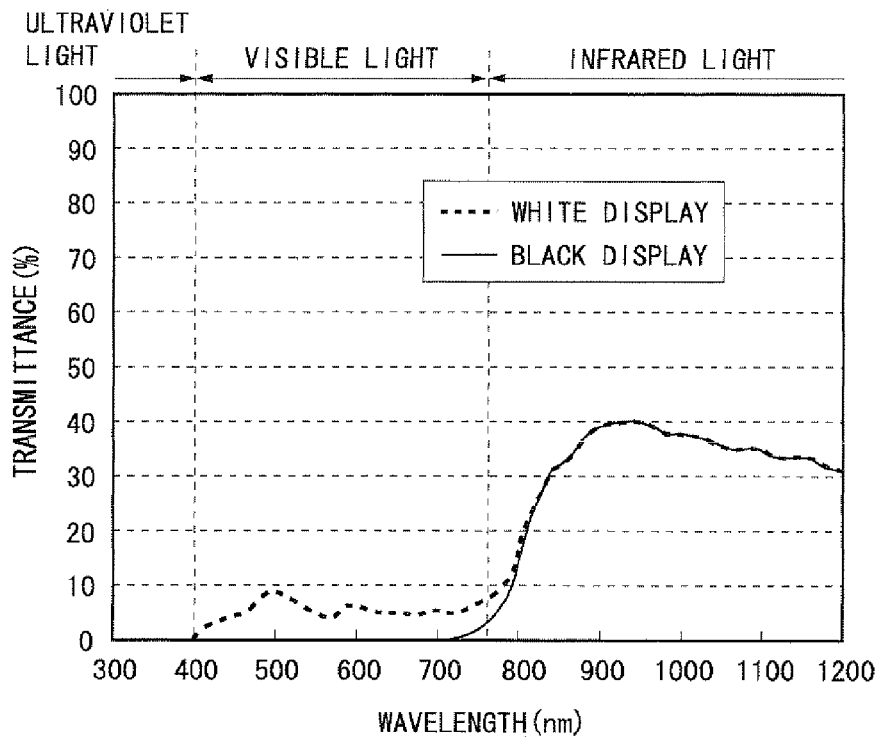
FIG. 14 is a diagram showing the transmission spectral characteristics of the liquid crystal panel of the device shown in FIG. 1.

The effects of the liquid crystal display device 10 according to the present embodiment will be described below. FIG. 14 is a diagram showing the transmission spectral characteristics of the liquid crystal panel 11. FIG. 14 describes light transmittance including a panel aperture ratio between the two polarizing plates 49 (transmittance for when light entering one polarizing plate is emitted from the other polarizing plate) for white display and black display. As shown in FIG. 14, the panel transmittance of infrared light is about 40% at the maximum and the panel transmittance of visible light for white display is about 5% on average. The panel transmittance of infrared light reaches its maximum when the wavelength is 912 nm.

When an optical sensor 2 detects reflected light of backlight light (light reflected off a finger, etc.), backlight light passes through the liquid crystal panel 11 and is reflected off a finger, and thereafter, enters the optical sensor 2. Therefore, the intensity of reflected light for when infrared light with a wavelength of 912 nm serves as backlight light, is about 32 times that for when visible light serves as backlight light (32={transmittance from the backlight to the finger}×{transmittance from the finger to the optical sensor}={0.4÷0.05}×{0.4÷0.05×0.5}). As such, the intensity of reflected light for when infrared light with an ideal wavelength serves as backlight light, is far greater than that for when visible light serves as backlight light.

Figure 15:
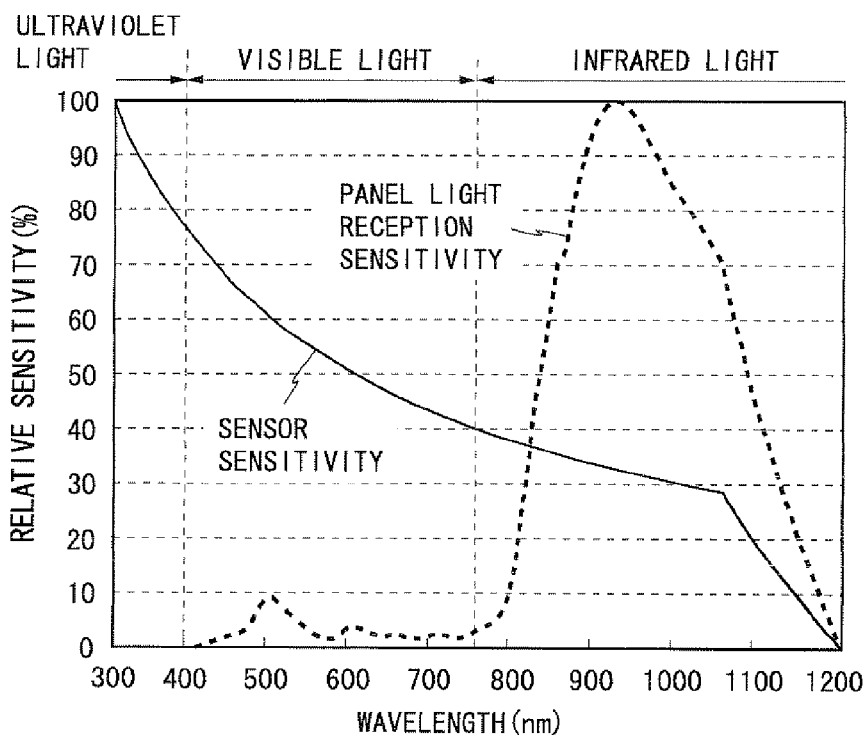
FIG. 15 is a diagram showing the sensor sensitivity characteristic and panel light reception sensitivity characteristic of the device shown in FIG. 1.

FIG. 15 is a diagram showing the sensitivity characteristic of the optical sensors 2 and the light reception sensitivity characteristic of the liquid crystal panel 11. FIG. 15 describes sensor sensitivity where the sensitivity for when the wavelength is 300 nm is 100%. Since the energy of light is proportional to the frequency (inversely proportional to the wavelength), as shown in FIG. 15, the sensor sensitivity is inversely proportional to the wavelength. Note, however, that, when the wavelength is 1050 nm or greater, the absorptance of polysilicon increases and thus the sensor sensitivity suddenly decreases.

When the light reception sensitivity characteristic of the liquid crystal panel 11 is determined based on the transmission spectral characteristics shown in FIG. 14 and the sensor sensitivity shown in FIG. 15, a characteristic shown by a dotted line in FIG. 15 is obtained. Note that this result is obtained by a multiplying, for each wavelength, the transmittance shown in FIG. 14 by the relative sensitivity shown by a solid line in FIG. 15 and representing the multiplication result in the form where the sensitivity for when the wavelength is 912 nm (at this time the panel light reception sensitivity reaches its maximum) is 100%. According to FIG. 15, the average panel light reception sensitivity for visible light is about 3.72% of the panel light reception sensitivity for light with a wavelength of 912 nm. Therefore, the panel light reception sensitivity for when infrared light with a wavelength of 912 nm serves as backlight light is about 20 times that for when visible light serves as backlight light. As such, the liquid crystal panel 11 has properties that the transmittance of infrared light is far higher than that of visible light, and the panel light reception sensitivity for when infrared light serves as backlight light is higher than the light reception sensitivity for when visible light serves as backlight light.

In the liquid crystal display device 10 according to the present embodiment, the infrared light transmitting filters 3 that allow infrared light to pass therethrough and cut off visible light are provided in the respective paths of light entering the optical sensors 2. Thus, a scanned image is not influenced by visible light included in outside light or backlight light, enabling to detect reflected light of infrared light emitted from the backlight 15 by the optical sensors 2. Accordingly, infrared light reflected off an object is detected and a touch position can be detected with high accuracy, based on an image that is not influenced by visible light included in large amount in outside light or other light sources (backlight).

By providing the backlight 15 including the infrared LEDs 5 to generate backlight light including infrared light, the light reception sensitivity of the liquid crystal panel 11 can be increased, enabling to detect a touch position with high accuracy. In addition, even if display data D2 is changed, the transmittance of infrared light does not change. Thus, a touch position can be detected irrespective of display data. Furthermore, by reducing the luminance of the backlight 15 by an amount corresponding to the increase in light reception sensitivity, the power consumption of the backlight 15 can be reduced.

Second Embodiment

Figure 16:
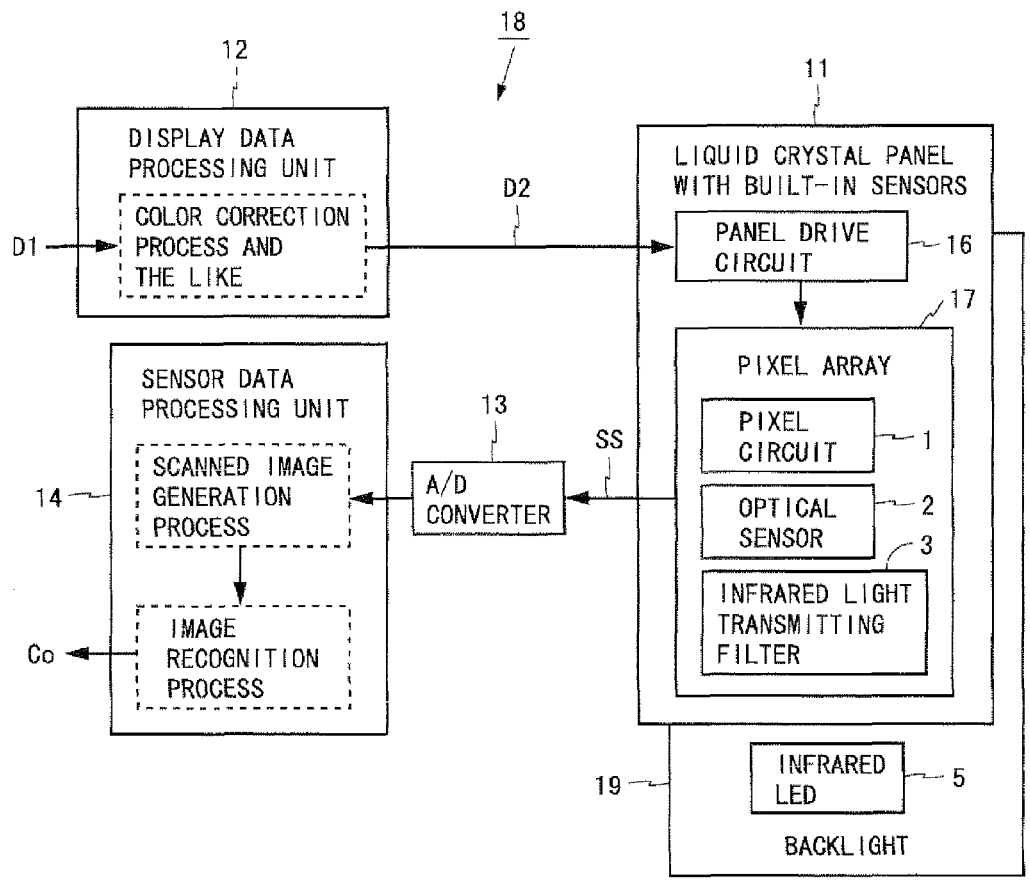
FIG. 16 is a block diagram showing a configuration of a liquid crystal display device according to a second embodiment of the present invention.

FIG. 16 is a block diagram showing a configuration of a liquid crystal display device according to a second embodiment of the present invention. A liquid crystal display device 18 shown in FIG. 16 is such that in the liquid crystal display device 10 according to the first embodiment the backlight 15 is replaced by a backlight 19. The backlight 19 includes infrared LEDs 5 but does not include any luminous element that emits visible light. In other words, the backlight 19 includes, as a light source, only the infrared LEDs 5 that emit infrared light. Except for the above-described point, the configuration of the liquid crystal display device 18 according to the present embodiment is the same as that of the liquid crystal display device 10 according to the first embodiment.

By thus providing the backlight 19 that emits only infrared light, a reflective-type liquid crystal display device that can detect a touch position with high accuracy, irrespective of display data can be configured.

Third Embodiment

A liquid crystal display device according to a third embodiment of the present invention has the same configuration as the liquid crystal display device 10 according to the first embodiment (see FIG. 1). In the present embodiment, the characteristics of infrared light transmitting filters 3 and a liquid crystal display device including a filter other than the infrared light transmitting filters 3 will be described. In the following, examples of a liquid crystal panel with built-in sensors (hereinafter, referred to as the liquid crystal panel) which is included in the liquid crystal display device according to the present embodiment will be described.

Figure 17:
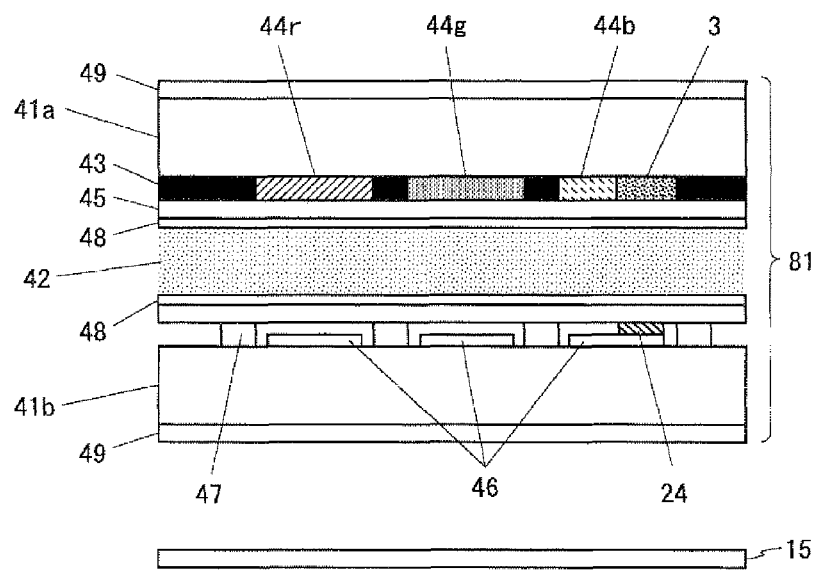
FIG. 17 is a diagram showing a cross section of a liquid crystal panel (first example) of a liquid crystal display device according to a third embodiment of the present invention.
Figure 18A:
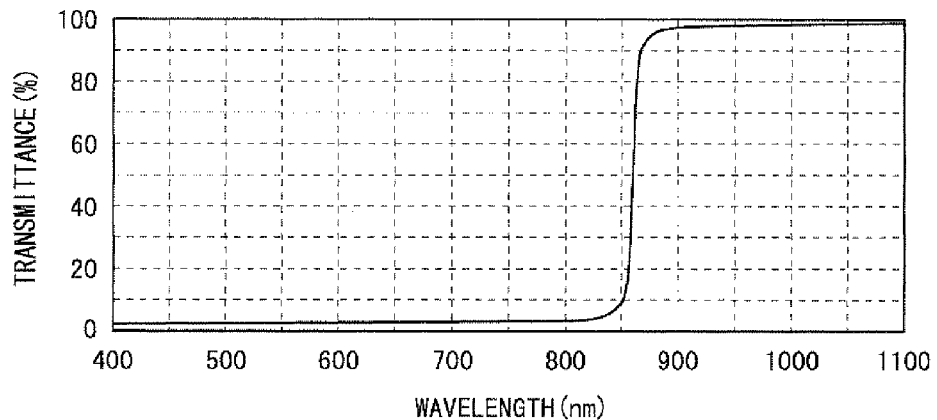
FIG. 18A is a diagram showing an example of the transmission characteristic of an infrared light transmitting filter shown in FIG. 17.

FIG. 17 is a diagram showing a cross section of a first example of the liquid crystal panel. In a liquid crystal panel 81 shown in FIG. 17, an infrared light transmitting filter 3 is provided above a photodiode 24 included in an optical sensor 2. The infrared light transmitting filter 3 has a pass band suitable for infrared light emitted from a backlight 15. FIG. 18A is a diagram showing an example of the transmission characteristic of the infrared light transmitting filters 3. The infrared light transmitting filters 3 having the characteristic shown in FIG. 18A are used with infrared LEDs 5 that emit infrared light in a wavelength range of 850 nm or greater. By thus arranging the optical sensor 2 in a position where the optical sensor 2 overlaps the infrared light transmitting filter 3 when viewed in a direction perpendicular to the pixel circuits 1, an image obtained by the optical sensors 2 is prevented from being influenced by visible light, enabling to detect a touch position with high accuracy.

Figure 18B:
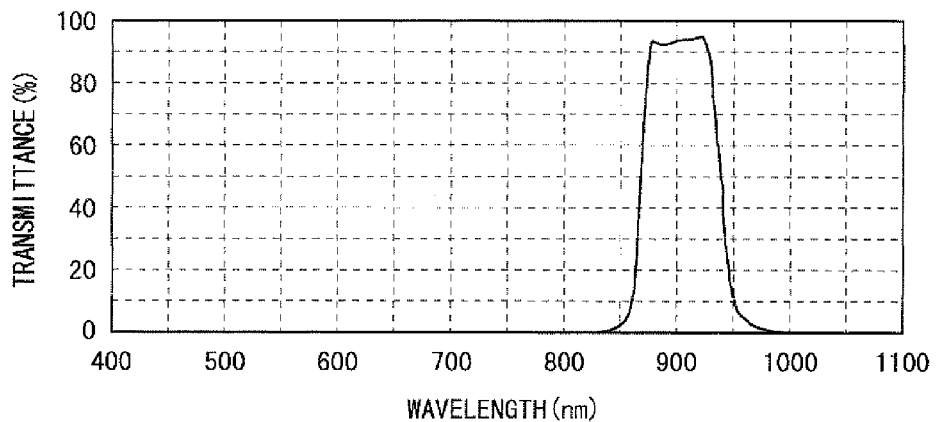
FIG. 18B is a diagram showing another example of the transmission characteristic of the infrared light transmitting filter shown in FIG. 17.

FIG. 18B is a diagram showing another example of the transmission characteristic of the infrared light transmitting filters 3. The infrared light transmitting filters 3 having the characteristic shown in FIG. 18B have a pass band having an upper limit and a lower limit suitable for infrared light emitted from the backlight 15, and cut off light outside the pass band. The infrared light transmitting filters 3 having the characteristic shown in FIG. 18B are used with infrared LEDs 5 that emit infrared light in a wavelength range of from 850 nm to 960 nm. By thus arranging the optical sensor 2 in a position where the optical sensor 2 overlaps the infrared light transmitting filter 3 when viewed in a direction perpendicular to the pixel circuits 1, an image obtained by the optical sensors 2 is prevented from being influenced by visible light, and light other than desired infrared light is reduced, enabling to detect a touch position with high accuracy.

Figure 19:
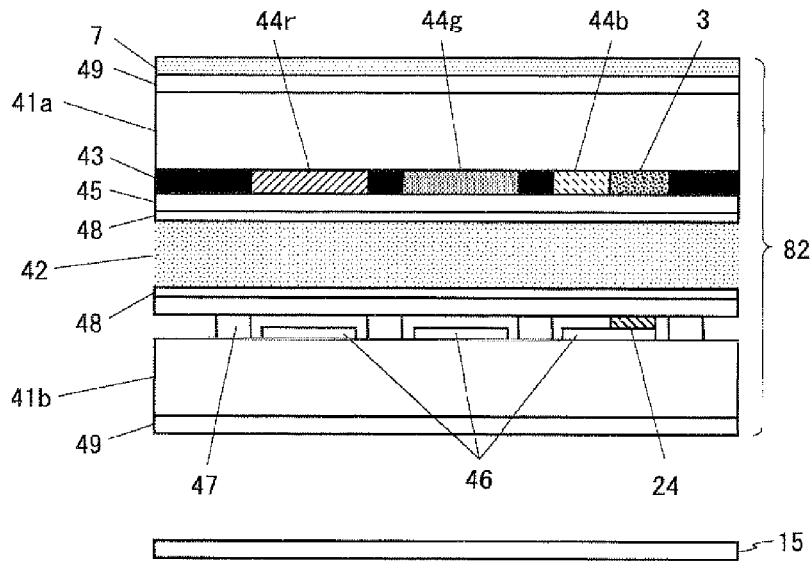
FIG. 19 is a diagram showing a cross section of a liquid crystal panel (second example) of the liquid crystal display device according to the third embodiment of the present invention.
Figure 20A:
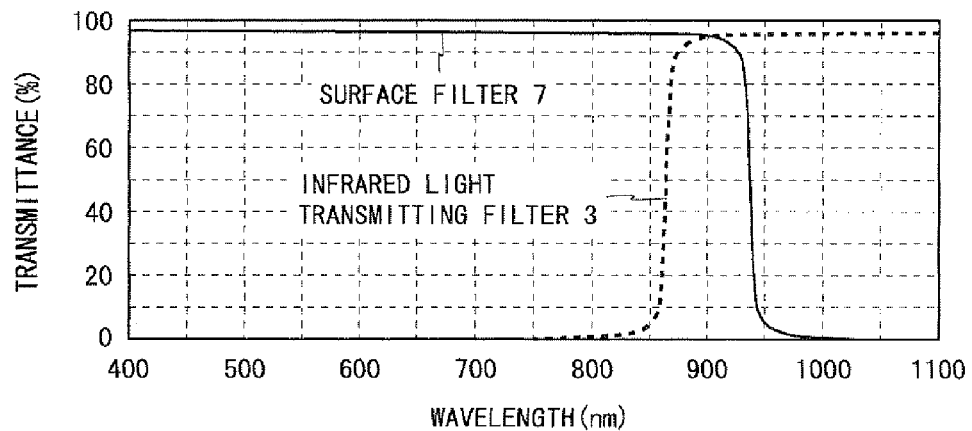
FIG. 20A is a diagram showing an example of the transmission characteristic of a surface filter shown in FIG. 19.
Figure 20B:
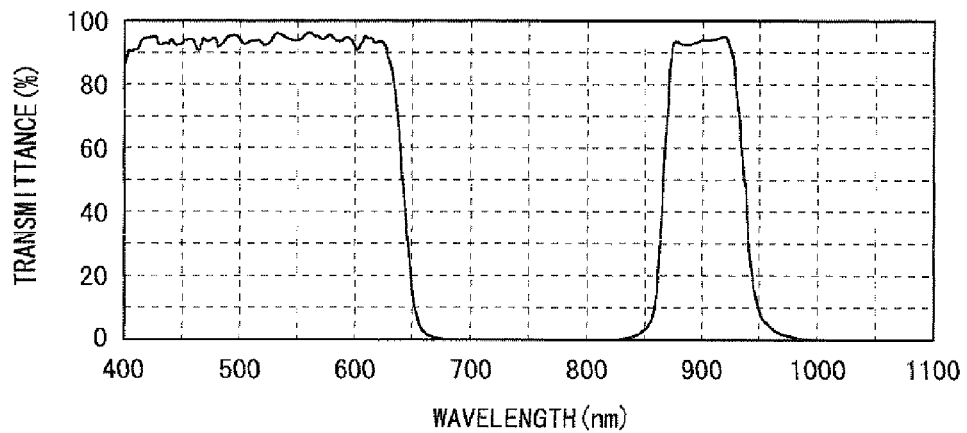
FIG. 20B is a diagram showing another example of the transmission characteristic of the surface filter shown in FIG. 19.
Figure 21:
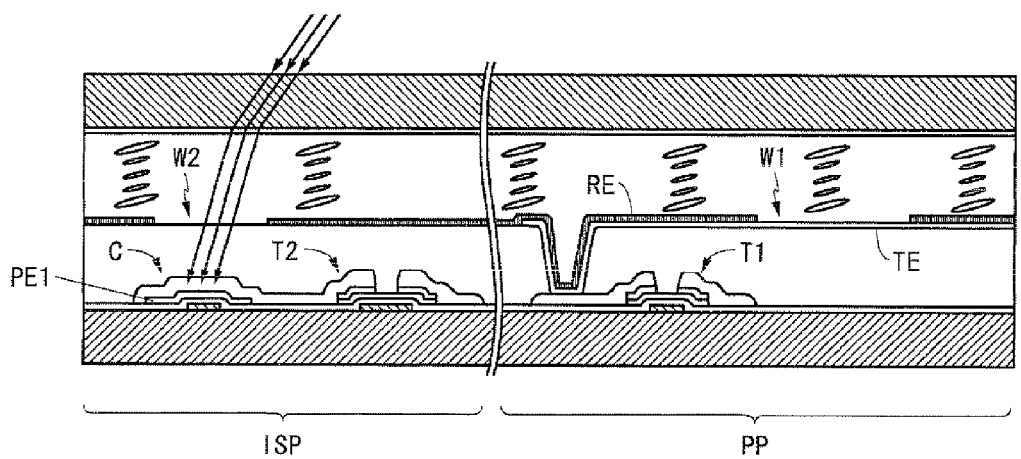
FIG. 21 is a cross-sectional view of a conventional liquid crystal panel having an infrared detecting portion.

FIG. 19 is a diagram showing a cross section of a second example of the liquid crystal panel. A liquid crystal panel 82 shown in FIG. 19 is such that a surface filter 7 is added to the liquid crystal panel 81 shown in FIG. 17. FIGS. 20A and 20B are diagrams showing examples of the transmission characteristic of the surface filter 7. The surface filter 7 having the transmission characteristic shown in FIG. 20A is a filter whose pass band includes a range extending from the visible light range to the long-wavelength range of infrared light emitted from the backlight 15. The surface filter 7 having the transmission characteristic shown in FIG. 202 is a filter whose pass band includes the visible light range and a range extending from the visible light range to the long-wavelength range of infrared light emitted from the backlight 15.

The surface filters 7 having the characteristics shown in FIGS. 20A and 20B are used with infrared LEDs 5 that emit infrared light in a wavelength range of from 850 nm to 960 nm. In this case, the surface filter 7 having the transmission characteristic shown in FIG. 20A allows visible light to pass therethrough and cuts off light with longer wavelengths than infrared light emitted from the backlight 15. The surface filter 7 having the transmission characteristic shown in FIG. 20B has a pass band that includes a part of the visible light range and the wavelength range of infrared light emitted from the backlight. By providing such surface filters 7, light other than visible light required for display and infrared light required for the operation of the optical sensors 2 is removed, enabling to detect a touch position with high accuracy.

Note that although in FIGS. 20A and 20B each surface filter 7 is provided on the front surface of the liquid crystal panel 82, a filter having the same characteristic may be provided in any position of each of the paths of light entering the optical sensors 2. Note also that although in the characteristic shown in FIG. 20B a part of the visible light range is a pass band, all the visible light range may be a pass band. By providing such a filter, light other than visible light required for display and desired infrared light is removed, enabling to detect a touch position with high accuracy.

As described above, according to liquid crystal display devices according to the embodiments of the present invention, by providing filter portions that allow infrared light to pass therethrough and cut off visible light and a backlight that emits at least light passing through the filter portions, reflected light of backlight light including infrared light is detected by optical sensors without receiving the influence of visible light included in outside light or backlight light, enabling to detect a touch position with high accuracy, irrespective of display data. Note that display devices other than liquid crystal display devices can also be configured by the above-described methods.

INDUSTRIAL APPLICABILITY

Display devices having optical sensors of the present invention have a feature that the display devices can detect a touch position with high accuracy irrespective of displayed image, without being influenced by visible light included in outside light or a backlight, and thus, can be used as various display devices such as liquid crystal display devices.

The invention claimed is:

1. A display device including a plurality of optical sensors, the display device comprising:
   a display panel including a plurality of pixel circuits and a plurality of optical sensors which are arranged two-dimensionally;
   filter portions that are provided in respective paths of light entering the optical sensors and that allow infrared light to pass therethrough and cut off visible light;
   a backlight that is provided on a back surface side of the display panel and that emits at least light passing through the filter portions;
   wherein the backlight includes a first luminous element that emits visible light; a second luminous element that emits infrared light; a light guide plate; and a reflection sheet that is provided on one surface of the light guide plate and that allows infrared light to pass therethrough and reflects visible light,
   wherein the first luminous element is arranged along a side surface of the light guide plate, and
   wherein the second luminous element is arranged on a side of the surface of the light guide plate where the reflection sheet is provided.

2. The display device according to claim 1, wherein the pixel circuits and the optical sensors are formed of polysilicon, and
   the backlight emits infrared light with a shorter wavelength than a fundamental absorption edge wavelength of silicon.

3. The display device according to claim 1, wherein the backlight emits infrared light having a peak wavelength in an absorption spectrum of an atmosphere.

4. The display device according to claim 3, wherein the backlight emits infrared light having a peak wavelength in a range of 850 nm to 960 nm.

5. The display device according to claim 1, wherein
   the filter portions have a pass band suitable for infrared light emitted from the backlight, and
   each of the optical sensors is arranged in a position in which the optical sensor overlaps a corresponding filter portion when viewed in a direction perpendicular to the pixel circuits.

6. The display device according to claim 5, wherein the filter portions have a pass band having an upper limit and a lower limit suitable for infrared light emitted from the backlight.

7. The display device according to claim 1, wherein the display panel further includes a filter that allows visible light to pass therethrough and cuts off light with longer wavelengths than infrared light emitted from the backlight.

8. The display device according to claim 1, wherein the display panel further includes a filter whose pass band includes all or part of a visible light range and a wavelength range of infrared light emitted from the backlight.

* * * * *